United States Patent [19]
Larker et al.

[11] 3,820,229
[45] June 28, 1974

[54] METHOD OF JOINING WIRE OF COMPOUND MATERIAL

[75] Inventors: Hans Larker; Jan Nilsson, both of Robertsfors, Sweden

[73] Assignee: Allmanna Svenska Elektriska Aktiebolaget, Vasteras, Sweden

[22] Filed: Feb. 5, 1973

[21] Appl. No.: 329,858

[30] Foreign Application Priority Data
Feb. 11, 1972 Sweden.............................. 1652/72

[52] U.S. Cl................................. 29/470.1, 29/479
[51] Int. Cl............................................ B23k 21/00
[58] Field of Search.... 29/470.1, 486, 497.5, 421 E, 29/479

[56] References Cited
UNITED STATES PATENTS
3,263,323  8/1966  Maher et al................... 29/421 E X 3,455,017  7/1969  Zondag................................. 29/482
3,520,049  7/1970  Lysenko et al.................... 29/497.5
3,535,767  10/1970  Doherty, Jr. et al............... 29/470.1

*Primary Examiner*—J. Spencer Overholser
*Assistant Examiner*—Ronald J. Shore

[57] ABSTRACT

In joining wire of a compound material having a core of aluminum and a casing of copper, two wire ends to be joined are formed with a conical male part and a female part with a conical recess. The copper casing covers a part of the conical point of the male part. A sleeve of explosive is applied around the joint and detonated to join the core and casing by explosion welding.

2 Claims, 3 Drawing Figures

METHOD OF JOINING WIRE OF COMPOUND MATERIAL

BACKGROUND OF THE INVENTION

1. Field of the Invention

The invention relates to a method of joining wire of a compound material.

2. The Prior Art

Method of joining wire of compound material

When manufacturing wire of compound material, for example, copper-clad aluminum wire of thin dimensions, hydrostatic extrusion straight down to the final dimension is uneconomical since the permissible cylinder pressure limits the extrusion ratio to values less than 2,000, usually less than 1,000. Thus, the extrusion ratio which can be achieved limits the weight of the billet. For high production and good economy in a press for hydrostatic extrusion the extruded wire must have a diameter of at least 5 mm. A diameter of 6 – 10 mm has been found to be extremely suitable for copper-aluminum wire. Wire lengths of 1,000 m and more can be obtained from one billet. The wire obtained can be machined by drawing to the desired dimension. When the extruded wire is drawn to a diameter of 0.4 mm, about 250,000 metres of wire are obtained from a single billet, which is more than enough for most purposes. However, wire lengths of 1,000 m are unsatisfactory as starting lengths for drawing in a drawing bench, since in principle drawing is a continuous method which requires enormous starting lengths if the production costs are to be kept low. A number of extruded lengths of wire must therefore be joined together in order to acquire lengths which can be economically drawn. However, it has been found extremely difficult to join compound wire in such a way that it may be drawn. Most welding methods involve such alterations in the material at and around the joint that the wire breaks during the drawing process. One of the main reasons for this is that hard and brittle alloys may be formed in the boundary layer between casing and core when the wire is heated. Alterations involving increased hardness and greater brittleness at the joint cause complications when the wire is drawn to smaller dimensions. The alteration of the properties of the material at the joint causes the drawing resistance to become altered when the joint passes a drawing plate. This alteration may give rise to jerks so that the wire breaks.

It has been found particularly difficult to obtain a satisfactory joint when joining wire having a core of aluminum and a casing of copper, because heating makes the bonding layer between copper and aluminum very hard and brittle so that the wire cannot be drawn to smaller dimensions. By joining the wire by means of pressure welding and removing the bulge, the problem of hard compounds has been solved, but unfortunately a joint is obtained which has no casing. This type of joint also causes problems during drawing. Furthermore, the wire at the joint has other properties and a different appearance from the rest of the wire. In order to obtain a compound wire with uniform properties, the joint has been provided with a new casing by joining a sleeve with the core and with the casings on either side of the joint by means of explosion welding.

Compound wire having a core of aluminum and a casing of copper has also been joined by exposing the core at the joint and welding together the cores of two wires, for example by means of electron-beam welding, and then applying a casing over the joint by explosion welding a sleeve or parts of the casing of the wire which has been removed from the core and bent back so that the cores have been accessible for welding. By explosion welding is meant a welding method in which a material is influenced by a pressure wave and thus pressed against another material with such force that the two materials become metallically bonded.

SUMMARY OF THE INVENTION

According to the invention, the ends of two wires having a core of aluminum and a casing of copper are formed with a conical point and a conical recess, respectively. A part of the conical point is covered by the copper casing. The conical male part is inserted into the recess of the female part to such a degree that the copper cover part of the male part extends within the female part. A sleeve of explosive is applied around the joint and detonated so that the core and casing are joined by explosion welding.

BRIEF DESCRIPTION OF THE DRAWINGS

The invention will be further described with reference to the accompanying drawings, in which.

DESCRIPTION OF THE PREFERRED EMBODIMENTS

Figure 1:
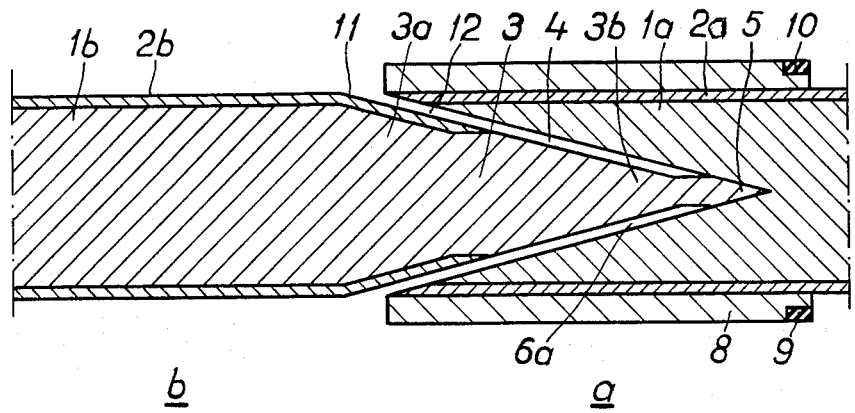
FIGS. 1 and 2 show two ways of shaping the wire ends to be joined and FIG. 3 how to reduce the diameter of a wire end which is to form a male part.
Figure 2:
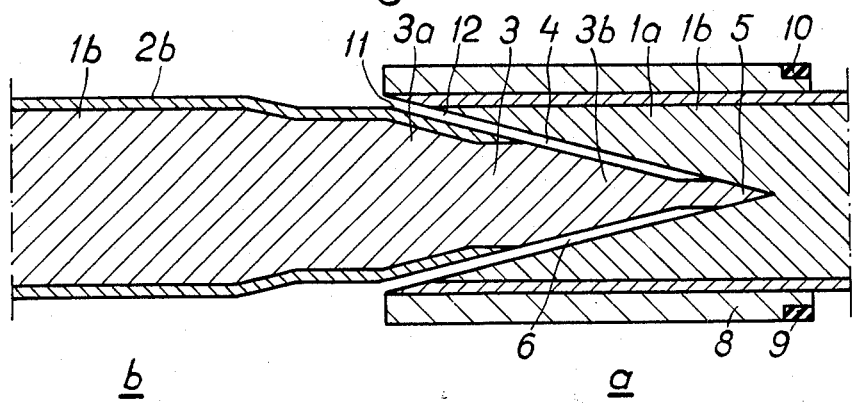

In the drawings, 1a and 1b designate the core and 2a and 2b the casing of two wires or rods which are to be joined. The left-hand wire end is shaped with a conical point 3 and the right-hand wire end with a conical recess 4. The extreme part 5 of the point 3 is shaped as a guide which centres the male part in the female part and fixes the male and female parts axially in relation to each other, so that a gap 6 of the desired size is obtained between them. Around the joint there is a sleeve 8 of an explosive with an annular firing mechanism 9 connected to a release means, not shown, by means of a cable 10. When the explosive sleeve is triggered, the wire is subjected to a pressure wave moving to the left which forces the material 1a and 2a in the female part with considerable force against the material 1b and 2b in the conical point of the male part.

As is clear from the figures, the casing 2b is drawn down a certain distance on and covers a considerably larger area of the point 3 of the male part than in previous methods, in which only the pointed part of the casing formed a part of the conical surface of the male part. The point is shaped so that the casing also covers part of the pointed part of the core, designated 3a, whereas only the foremost part of the point, designated 3b, and the guide 5 consist solely of core material. In this way, the conical surface 11 of the casing on the male part will have a longer axial extension than the internal conical surface 12 in the female part.

Despite the variation in the mutually axial positions of the parts, the whole surface 12 of the casing 2a may come into contact with the surface 11 of the same material, in the present case copper, in the explosion joining. What is gained is that the surface 12 only engages the conical surface 11, which is completely cleaned off by the air, which is pressed out of the gap in the joining. The shape according to the invention has completely eliminated the risk of the external part of the surface 12 engaging the cylindrical surface on the casing 2b, further there is no risk of obtaining a part with bad bonding against a surface which is not cleaned off, and of the surface 12 engaging an aluminum surface on the fore part of the male part.

Figure 3:
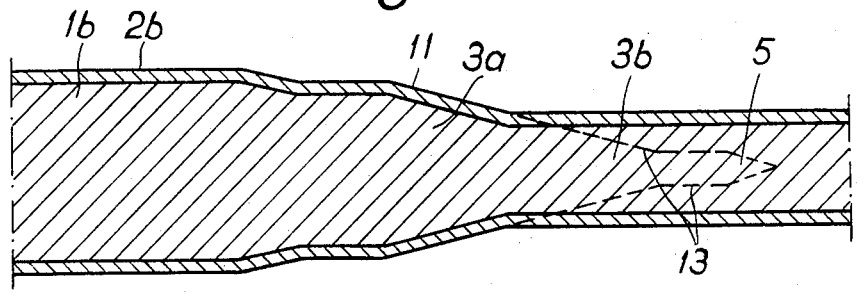

When shaping the male part the diameter of the rod or wire is reduced in such a way that a conical transition is obtained between two different diameters. The cone angle of the conical transition part is suitably chosen to be equal to the cone angle of the finished male part. After this the rod or wire is provided with a conical point, the generatrix of which constitutes a continuation of the generatrix of the transition cone, as shown by the broken lines 13 in FIG. 3.

We claim:

1. Method of joining wire of compound material having a core of aluminum and a casing of copper, which comprises shaping two wire ends to be joined to form a male part having a pointed portion and a female part, the pointed portion of said male part having a part of the core thereof covered by the copper casing, inserting the male part into the female part to such a degree that the copper-covered part of the male part extends within the female part, applying a sleeve of explosive around the joint and detonating it so that the core and the casing are joined in one operation by means of explosion welding.

2. Method according to claim 1, in which the shaping comprises shaping the male part with a conical point and the female part with a conical recess.

* * * * *